United States Patent
Vokey

(10) Patent No.: US 7,602,196 B2
(45) Date of Patent: Oct. 13, 2009

(54) METHOD TO DETECT AND LOCATE A BREACH IN A ROOF MEMBRANE

(75) Inventor: David E. Vokey, Sidney (CA)

(73) Assignee: Detec Systems Inc., Sidney, British Columbia ( * ) Notice: Subject to any disclaimer, the term of this patent is extended or adjusted under 35 U.S.C. 154(b) by 142 days.

(21) Appl. No.: 12/020,935

(22) Filed: Jan. 28, 2008

(65) Prior Publication Data

US 2009/0188202 A1 Jul. 30, 2009

(51) Int. Cl.
*G01R 27/08* (2006.01)
*G01N 27/00* (2006.01)

(52) U.S. Cl. .................. 324/718; 324/693; 324/557
(58) Field of Classification Search ................ 324/718, 324/693, 326, 557
See application file for complete search history.

(56) References Cited

U.S. PATENT DOCUMENTS

| | | | |
|---|---|---|---|
| 4,110,945 A * | 9/1978 | Sheahan | ............. 52/173.1 |
| 4,565,965 A | 1/1986 | Geesen | |
| 4,598,273 A * | 7/1986 | Bryan et al. | ........... 340/539.26 |
| 6,267,000 B1 * | 7/2001 | Harper et al. | ............ 73/40.5 R |

* cited by examiner

*Primary Examiner*—Timothy J Dole
*Assistant Examiner*—Farhana Hoque
(74) *Attorney, Agent, or Firm*—Adrian D. Battison; Ade & Company Inc.

(57) ABSTRACT

A defect in a roof membrane is detected by applying a DC voltage between the roof deck and a perimeter conductor and using a detection probe pair to provide a signal indicative of the differences in voltage detected by the pair of probes so as to allow the operator to locate the defect by moving the probes to different locations. The probes are mounted on a rigid common frame such that the probe pair has a fixed separation and the frame includes a handle portion which allows ready manipulation of the frame carrying the probes by the operator. The receiver provides an audible signal emitter to the operator and includes a calibration circuit arranged to automatically maintain, despite changes in voltage applied between the roof deck and the peripheral conductor, a "0" set calibration point so as to indicate at the calibration point when zero difference in voltage is detected.

13 Claims, 2 Drawing Sheets

METHOD TO DETECT AND LOCATE A BREACH IN A ROOF MEMBRANE

The present invention relates to a system for testing roof membranes to detect and locate damage and moisture penetration in both a roof membrane. It has particular application to testing the integrity of low-slope and flat roofs of residential and commercial buildings.

BACKGROUND OF THE INVENTION

The failure to detect, find, and correct minor roof deterioration in the earliest stages is considered the greatest cause of premature roof failure. This is particularly true of roofing materials applied on low-slope or flat roofs. Costly roofing problems are often the result of design deficiencies or faulty application of the roof system. Even when properly designed and applied, all roofing materials deteriorate from the contraction and expansion of roof decks and natural aging processes.

Several methods have been used to try and locate roof leaks after they have occurred. Electric capacitance meters identify leaks using a low-frequency method that measures dielectric constant changes in the roofing material as a result of moisture below the membrane. Infrared cameras allow technicians to scan roof surfaces for temperature differentials that signify moist areas through changes in thermal conductivity or evaporation. These methods are typically used in forensic analysis only after significant leakage has occurred.

Electric field mapping uses a wire loop around the perimeter of the roof surface to introduce an electric potential between the structural deck and a selected roof area which is sprayed with water. The electric field potential caused by a conductive path to any roof membrane damage is then located using a voltmeter and a pair of probes.

U.S. Pat. No. 4,565,965 issued Jan. 21, 1986 to Geesen discloses an electric field mapping arrangement for detecting leaks in flat roofs in which electrical pulses are transmitted through the moisture in the leak to the roof edge. The roof is then scanned by a pulse sensor and hand-held probe rods to find the leak by locating the maximum amplitude. The disclosure of this prior patent is incorporated herein by reference.

The method as described by Geesen requires considerable experience and careful placement of a wire loop around the perimeter of the area to be tested. A pair of hand held probes are positioned on the surface to be tested while the operator simultaneously views a meter dial reading. A low frequency dc pulse generator is used to energize the area under test. The locating signal is thereby switched on and off at regular intervals which allows adjustment of the "0" set calibration between pulses when needed. This results in a charging current rush at the beginning of every pulse. On larger decks the charging current is large enough to cause a false reading on the meter thus indicating a roof membrane defect where none exists. The placing and spacing of the probes require care in both position and spacing to avoid erroneous readings.

SUMMARY OF THE INVENTION

It is an object of the present invention to provide an apparatus and method for the detection and location of moisture penetration in flat or low-slope roof membranes.

According to a first aspect of the invention there is provided a method of locating a defect in a roof membrane, where the roof comprises a generally horizontal roof deck with a water impermeable membrane applied onto the deck, the method comprising:

providing a perimeter conductor around an area to be tested;

applying a DC voltage between the roof deck and the perimeter conductor;

using a detection probe pair and engaging the probe pair with the roof membrane at different locations on the membrane to detect a voltage generated by current flowing between the roof deck and the perimeter conductor;

providing a receiver which acts to detect differences between the voltages detected by the probes;

the receiver being arranged to provide to an operator controlling the location of the probes a signal indicative of the differences so as to allow the operator to locate the defect by moving the probes to different locations;

wherein the probes are mounted on a rigid common frame such that the probe pair has a fixed separation and the frame includes a handle portion which allows ready manipulation of the frame carrying the probes by the operator.

Preferably the frame includes a pair of upstanding legs onto a lower end of each of which a respective one of the probes is mounted.

Preferably the frame includes a center handles portion between the legs.

Preferably the receiver is mounted on the frame.

Preferably the receiver includes a variable sensitivity and an analog display for the differences in current detected.

Preferably the receiver provides an audible signal emitter such that a signal indicating a maximum difference between the voltages detected can be determined audibly.

Preferably the audible signal emitter includes a voltage to frequency converter.

Preferably the receiver includes a calibration circuit arranged to automatically maintain, despite changes in voltage applied between the roof deck and the peripheral conductor, a "0" set calibration point so as to indicate at the calibration point when zero difference in voltage is detected.

In order to achieve this preferably the calibration circuit includes an operational amplifier arranged to provide a circuit common ground from an input tied to the half the supply voltage point between +V and −V through equal value dividing resistors.

According to a second aspect of the invention there is provided a method of locating a defect in a roof membrane, where the roof comprises a generally horizontal roof deck with a water impermeable membrane applied onto the deck, the method comprising:

providing a perimeter conductor around an area to be tested;

applying a DC voltage between the roof deck and the perimeter conductor;

using a detection probe pair and engaging the probe pair with the roof membrane at different locations on the membrane to detect a voltage generated by current flowing between the roof deck and the perimeter conductor;

providing a receiver which acts to detect differences between the voltages detected by the probes;

the receiver being arranged to provide to an operator controlling the location of the probes a signal indicative of the differences so as to allow the operator to locate the defect by moving the probes to different locations;

wherein the receiver provides an audible signal emitter to the operator such that a signal indicating a maximum difference between the voltages detected can be determined audibly.

According to a third aspect of the invention there is provided a method of locating a defect in a roof membrane, where the roof comprises a generally horizontal roof deck with a water impermeable membrane applied onto the deck, the method comprising:

providing a perimeter conductor around an area to be tested;

applying a DC voltage between the roof deck and the perimeter conductor;

using a detection probe pair and engaging the probe pair with the roof membrane at different locations on the membrane to detect a voltage generated by current flowing between the roof deck and the perimeter conductor;

providing a receiver which acts to detect differences between the voltages detected by the probes;

the receiver being arranged to provide to an operator controlling the location of the probes a signal indicative of the differences so as to allow the operator to locate the defect by moving the probes to different locations;

wherein the receiver includes a calibration circuit arranged to automatically maintain, despite changes in voltage applied between the roof deck and the peripheral conductor, a "0" set calibration point so as to indicate at the calibration point when zero difference in voltage is detected.

BRIEF DESCRIPTION OF THE DRAWINGS

One embodiment of the invention will now be described in conjunction with the accompanying drawings in which.

DESCRIPTION OF THE PREFERRED EMBODIMENT

Figure 1:
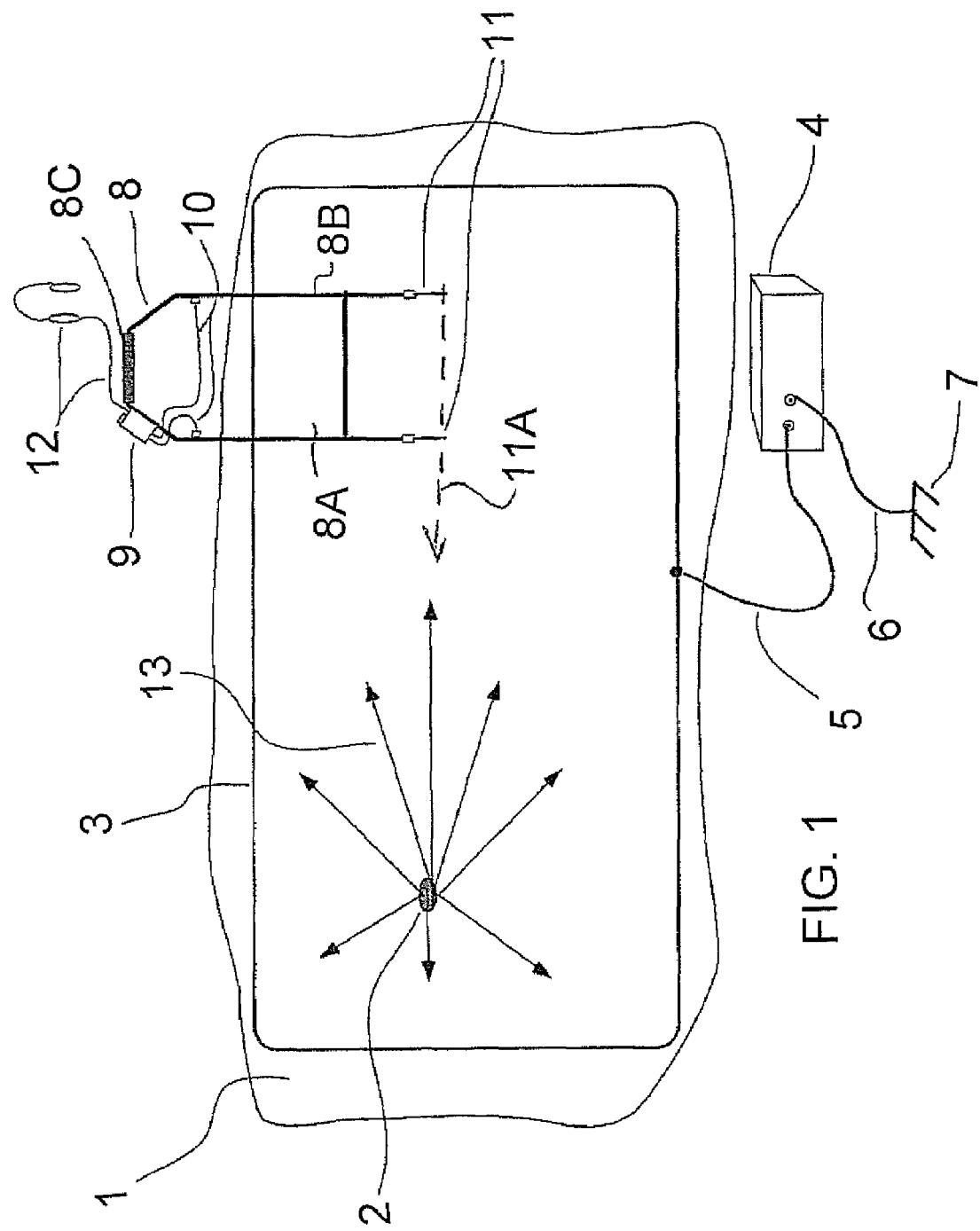
FIG. 1 is an isometric view of the frame mounted leak location system on a roof deck
Figure 2:
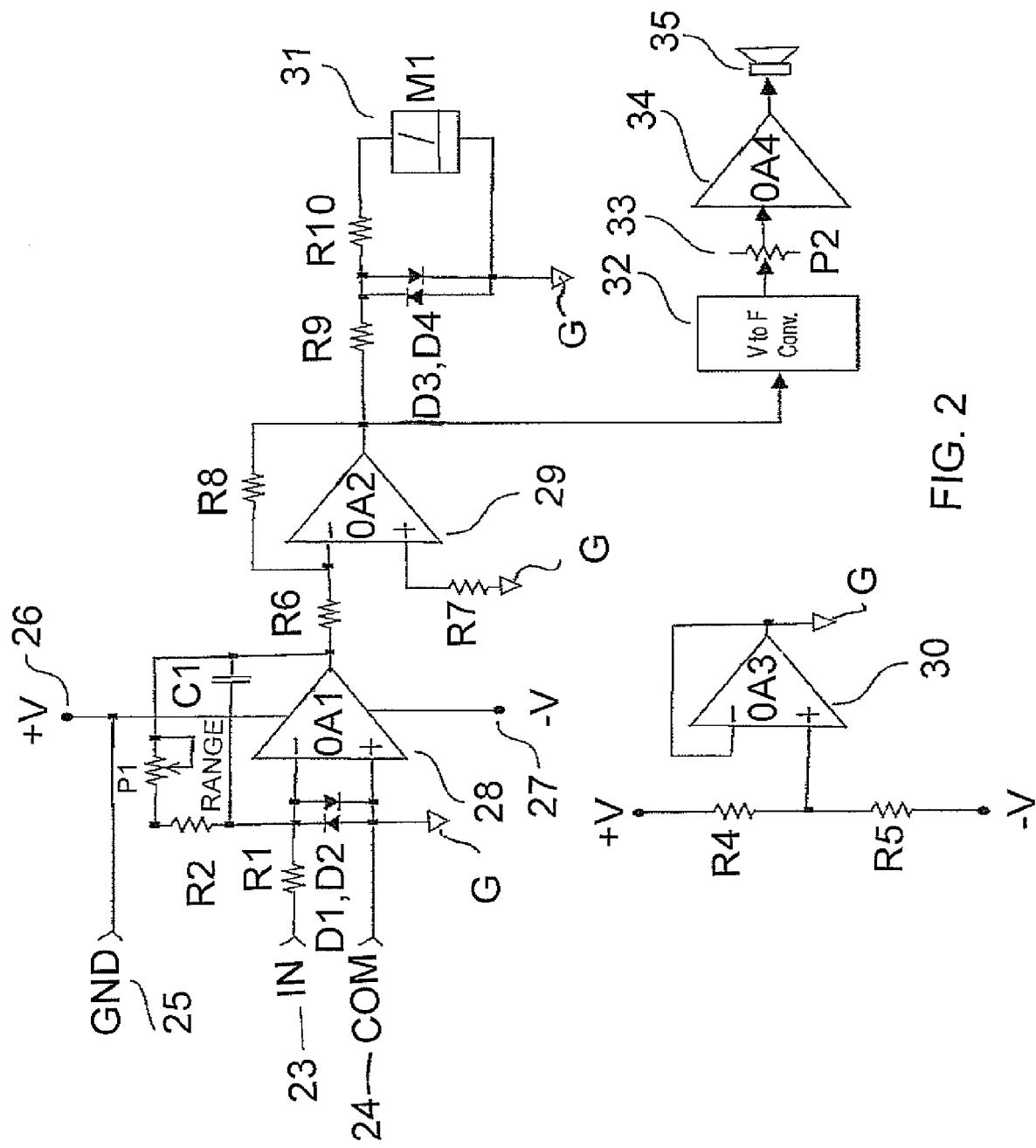
FIG. 2 is a circuit schematic of the receiver of FIG. 1 which includes an auto-zeroing receiver system and an audible alert.

The operation of the horizontal roof membrane leak location system is shown in FIG. 1. A bare conductor 3 is placed in a closed loop on top of the roof membrane area to be tested. A DC power source 4 is connected between the roof deck and the energizing conductor 3 by a grounding cable 6 connected to a building ground point 7 on the roof deck and an energizing cable 5 connected to the loop conductor 3. The surface of the roof membrane is then sprayed with water so as to dampen the entire area 1 under test.

A probe mounting frame 8 with a receiver 9 attached to the frame is positioned within the area to be tested. Two insulated conducting probes 11 carried on the frame are connected to the input of the receiver 9, mounted on the frame, by two insulated connecting cables 10. A headphone and connecting cable 12 is plugged into the audio output jack on the receiver 9. The frame is a fixed structure which provides two legs 8A and 8B at fixed separation and position to hold the probes at a fixed spacing. The legs are carried on a handle 8C which can be grasped by a single hand of the operator to simultaneously manipulate the position and orientation of the frame and the probes.

Thus the frame includes a pair of upstanding legs onto a lower end of each of which a respective one of the probes is mounted so as to project downwardly therefrom. The frame includes a center handle portion between the legs.

An electrical circuit is formed between the roof deck via the building ground 7 and the energizing cable 3 through any roof membrane defect 2 which provides a conductive path through the membrane. With the roof circuit energized, the mounting frame 8 is positioned on the roof membrane and the probes 11 brought into electrical connection with the roof membrane so that current flows to the two probes.

It will be appreciated that the amplitude of the current decreases along any line extending from the defect to the peripheral cable 3.

The voltage connected between the roof deck and the peripheral conductor is constant so as to generate a constant current flow rather than the use of pulses which generate a varying current due to the charging current rush at the beginning of every pulse. The difference between the currents detected by the two probes is at a maximum when a line 11A joining the probes 11 is aligned with the defect. The current is at a maximum when the probes are closest to the defect.

With the probes fixed on the frame 8, the frame is rotated by the operator until the maximum difference between the two currents is detected to provide a maximum pulse rate in the headphones 12 which corresponds to a maximum reading on the signal level meter 9. In this position, the operator knows that the line 11A joining the probes is aligned with the defect. The mounting frame is thereby brought into directional alignment with the current 13 from the defect so as to indicate the direction to the location of the defect 2. The mounting frame is then advanced in steps along that line 11A until a maximum signal level and audible pulse rate is achieved thus indicating the actual location of the defect.

The schematic diagram for the receiver unit is shown in FIG. 3. The two mounting frame probes 11 are connected by the insulated cables 10 to the respective input terminals 23 and 24. One side 23 is connected to the negative summing input of a first stage op-amp 28 through a resistor R1. The other side 24 is tied to circuit common. Diodes D1 and D2 provide input protection. The gain of the first stage op-amp is set by resistor R2 and potentiometer P1 while capacitor C1 filters out any unwanted noise.

The output of the first stage op-amp 28 is tied to the input of a second stage op-amp 29 through a resistor R6. Resistors R6 and R8 set the gain of the second stage op-amp 29 to unity. The positive summing input of the second stage op-amp 29 is tied to common through a resistor R7.

A voltage-to-frequency converter 32 has an input which is connected to the output of the second stage op-amp 29. The output of the V to F converter 32 is applied to the input of an audio-amp 34 through a volume control 33. The audio output of amp 34 is connected to the headphones 12 or to a speaker 24.

The output of the second stage op-amp 29 is connected to voltage limiting diodes D3 and D4 through a resistor R9. A signal level meter 31 is connected in series with a scaling resistor R10 across the diodes D3 and D4.

In order to avoid the need for zero offset adjustment of the meter circuit 31 as the supply voltage V changes, there is provided a circuit component which provides self adjustment of the common ground G of the main circuit connected to the op-amps 28 and 29. Thus the positive summing input of a third op-amp 30 is tied to the half the supply voltage point between +V and −V through equal value dividing resistors R4 and R5. The negative summing input and output port of op-amp 30 forms the circuit common G. In this way there is automatic adjustment of the circuit ground so that the meter is always centered at zero voltage difference between the probes and the meter moves away from the center position when a current difference is detected.

The invention claimed is:

1. A method of locating a defect in a roof membrane, where the roof comprises a generally horizontal roof deck with a water impermeable membrane applied onto the deck, the method comprising:

providing a perimeter conductor around an area to be tested;

applying a DC voltage between the roof deck and the perimeter conductor;

using a detection probe pair and engaging the probe pair with the roof membrane at different locations on the membrane to detect a voltage generated by current flowing between the roof deck and the perimeter conductor;

providing a receiver which acts to detect differences between the voltages detected by the probes;

the receiver being arranged to provide to an operator controlling the location of the probes a signal indicative of the differences so as to allow the operator to locate the defect by moving the probes to different locations;

wherein the probes are mounted on a rigid common frame such that the probe pair has a fixed separation and the frame includes a handle portion which allows ready manipulation of the frame carrying the probes by the operator.

2. The method according to claim 1 wherein the frame includes a pair of upstanding legs onto a lower end of each of which a respective one of the probes is mounted.

3. The method according to claim 1 wherein the frame includes a center handles portion between the legs.

4. The method according to claim 1 wherein the receiver is mounted on the frame.

5. The method according to claim 1 wherein the receiver includes a variable sensitivity and an analog display for the differences in current detected.

6. The method according to claim 1 wherein the receiver provides an audible signal emitter such that a signal indicating a maximum difference between the voltages detected can be determined audibly.

7. The method according to claim 6 wherein the audible signal emitter includes a voltage to frequency converter.

8. The method according to claim 1 wherein the receiver includes a calibration circuit arranged to automatically maintain, despite changes in voltage applied between the roof deck and the peripheral conductor, a "0" set calibration point so as to indicate at the calibration point when zero difference in voltage is detected.

9. The method according to claim 8 wherein the calibration circuit includes an operational amplifier arranged to provide a circuit common ground from an input tied to the half the supply voltage point between +V and −V through equal value dividing resistors.

10. A method of locating a defect in a roof membrane, where the roof comprises a generally horizontal roof deck with a water impermeable membrane applied onto the deck, the method comprising:

providing a perimeter conductor around an area to be tested;

applying a DC voltage between the roof deck and the perimeter conductor;

using a detection probe pair and engaging the probe pair with the roof membrane at different locations on the membrane to detect a voltage generated by current flowing between the roof deck and the perimeter conductor;

providing a receiver which acts to detect differences between the voltages detected by the probes;

the receiver being arranged to provide to an operator controlling the location of the probes a signal indicative of the differences so as to allow the operator to locate the defect by moving the probes to different locations;

wherein the receiver provides an audible signal emitter to the operator such that a signal indicating a maximum difference between the voltages detected can be determined audibly.

11. The method according to claim 10 wherein the audible signal emitter includes a voltage to frequency converter.

12. A method of locating a defect in a roof membrane, where the roof comprises a generally horizontal roof deck with a water impermeable membrane applied onto the deck, the method comprising:

providing a perimeter conductor around an area to be tested;

applying a DC voltage between the roof deck and the perimeter conductor;

using a detection probe pair and engaging the probe pair with the roof membrane at different locations on the membrane to detect a voltage generated by current flowing between the roof deck and the perimeter conductor;

providing a receiver which acts to detect differences between the voltages detected by the probes;

the receiver being arranged to provide to an operator controlling the location of the probes a signal indicative of the differences so as to allow the operator to locate the defect by moving the probes to different locations;

wherein the receiver includes a calibration circuit arranged to automatically maintain, despite changes in voltage applied between the roof deck and the peripheral conductor, a "0" set calibration point so as to indicate at the calibration point when zero difference in voltage is detected.

13. The method according to claim 12 wherein the calibration circuit includes an operational amplifier arranged to provide a circuit common ground from an input tied to the half the supply voltage point between +V and −V through equal value dividing resistors.

* * * * *